US010474747B2

(12) United States Patent
Jamrog et al.

(10) Patent No.: US 10,474,747 B2
(45) Date of Patent: Nov. 12, 2019

(54) ADJUSTING TIME DEPENDENT TERMINOLOGY IN A QUESTION AND ANSWER SYSTEM

(71) Applicant: International Business Machines Corporation, Armonk, NY (US)

(72) Inventors: Daniel M. Jamrog, Acton, MA (US); Jason D. LaVoie, Littleton, MA (US); Nicholas W. Orrick, Austin, TX (US); Kristin A. Witherspoon, Somerville, MA (US)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 14/107,313

(22) Filed: Dec. 16, 2013

(65) Prior Publication Data

US 2015/0169539 A1    Jun. 18, 2015

(51) Int. Cl.
*G06F 17/27*    (2006.01)

(52) U.S. Cl.
CPC ............... *G06F 17/2705* (2013.01)

(58) Field of Classification Search
CPC ....... G06F 17/20–289; G06F 17/30864; G06F 17/3053; G06F 17/30321; G06F 3/04842; G06F 17/30017; G06F 17/30386; G06F 17/30; G06F 17/3002; G06F 17/30023; G06F 17/30306; G06F 17/30312; G06F 16/951; G06F 16/313; G06F 16/24578; G06F 17/2785; G06F 16/24575; G06F 16/337; G06F 16/353; G06F 16/3344; G06F 16/374; G06F 16/7867; G06F 16/95; G06F 17/2795

USPC ...... 704/1–10, 270–275, 250, 251, 255, 257
See application file for complete search history.

(56) References Cited

U.S. PATENT DOCUMENTS

| | | | |
|---|---|---|---|
| 5,371,673 A * | 12/1994 | Fan ................... | G06Q 30/02 704/1 |
| 7,805,300 B2 | 9/2010 | Gorin et al. | |
| 7,809,664 B2 * | 10/2010 | Heck .................. | G06N 3/004 704/10 |
| 7,930,288 B2 | 4/2011 | Delgado et al. | |
| 7,962,495 B2 | 6/2011 | Jain et al. | |
| 8,346,563 B1 | 1/2013 | Hjelm et al. | |

(Continued)

FOREIGN PATENT DOCUMENTS

WO    2014155209 A1    10/2014

OTHER PUBLICATIONS

Pustejovsky et al., "Temporal and Event Information in Natural Language Text," Language Resources and Evaluation, May 2005, vol. 39, issue ⅔, 48 pages.

(Continued)

*Primary Examiner* — Huyen X Vo
(74) *Attorney, Agent, or Firm* — VanLeeuwen & VanLeeuwen; Reza Sarbakhsh

(57) ABSTRACT

An approach is provided to adjust time dependent terminology in a question and answering (QA) system. The approach ingests a set of documents to produce a corpus utilized by the QA system. A base time is established and the approach acquires a temporally accurate lexicon of terms that correspond to the base time. A corpus of the QA system is updated according to the lexicon. The QA system answers a question according to the updated corpus.

12 Claims, 5 Drawing Sheets

(56) References Cited

U.S. PATENT DOCUMENTS

| | | | | |
|---|---|---|---|---|
| 8,429,106 B2* | 4/2013 | Downs | ............... | G06F 17/2745 706/21 |
| 8,520,025 B2* | 8/2013 | Patterson | ............ | G06F 17/2235 345/619 |
| 8,527,269 B1* | 9/2013 | Kapur | ............... | G06F 17/2735 704/235 |
| 8,838,457 B2* | 9/2014 | Cerra | .................. | G10L 15/183 704/275 |
| 9,213,687 B2* | 12/2015 | Au | ......................... | G06F 17/27 |
| 9,304,985 B1* | 4/2016 | Raghunathan | .......... | G06F 17/27 |
| 9,336,192 B1* | 5/2016 | Barba | .................. | G06F 17/277 |
| 2006/0176836 A1* | 8/2006 | Jennings, III | ......... | H04L 67/104 370/299 |
| 2010/0318526 A1 | 12/2010 | Nakazawa et al. | | |
| 2011/0223567 A1 | 9/2011 | Staats et al. | | |
| 2011/0238410 A1* | 9/2011 | Larcheveque | ...... | G06F 17/2785 704/9 |
| 2011/0313757 A1* | 12/2011 | Hoover | ................ | G06F 17/274 704/9 |
| 2012/0054645 A1 | 3/2012 | Hoomani et al. | | |
| 2012/0089394 A1* | 4/2012 | Teodosiu | ............ | G06F 17/2785 704/235 |
| 2012/0102050 A1 | 4/2012 | Button et al. | | |
| 2012/0191716 A1 | 7/2012 | Omoigui | | |
| 2013/0036107 A1 | 2/2013 | Benyamin et al. | | |
| 2013/0103389 A1* | 4/2013 | Gattani | .................. | G06F 17/28 704/9 |
| 2014/0236571 A1* | 8/2014 | Quirk | .................... | G06F 17/271 704/9 |
| 2015/0066479 A1* | 3/2015 | Pasupalak | ............... | G06F 17/27 704/9 |
| 2015/0169539 A1* | 6/2015 | Jamrog | ............... | G06F 17/2705 704/9 |

OTHER PUBLICATIONS

International Search Report (dated Dec. 16, 2013) and Written Opinion (dated Feb. 4, 2015) for International Application No. PCT/CA2014/051071, 8 pages.

* cited by examiner

ADJUSTING TIME DEPENDENT TERMINOLOGY IN A QUESTION AND ANSWER SYSTEM

BACKGROUND OF THE INVENTION

A Question/Answer System, such as the IBM Watson™ system is an artificially intelligent computer system capable of answering questions posed in natural language. A QA computing system is generally built to apply advanced natural language processing, information retrieval, knowledge representation, automated reasoning, and machine learning technologies to the field of open domain question answering. One of the challenges of teaching a deep-analytic QA system is keeping the system current with the latest terms, people, and events. The lexicon, vocabulary, and slang used in a language evolves rapidly over time.

SUMMARY

An approach is provided to adjust time dependent terminology in a question and answering (QA) system. The approach ingests a set of documents to produce a corpus utilized by the QA system. A base time is established and the approach acquires a temporally accurate lexicon of terms that correspond to the base time. A corpus of the QA system is updated according to the lexicon. The QA system answers a question according to the updated corpus.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
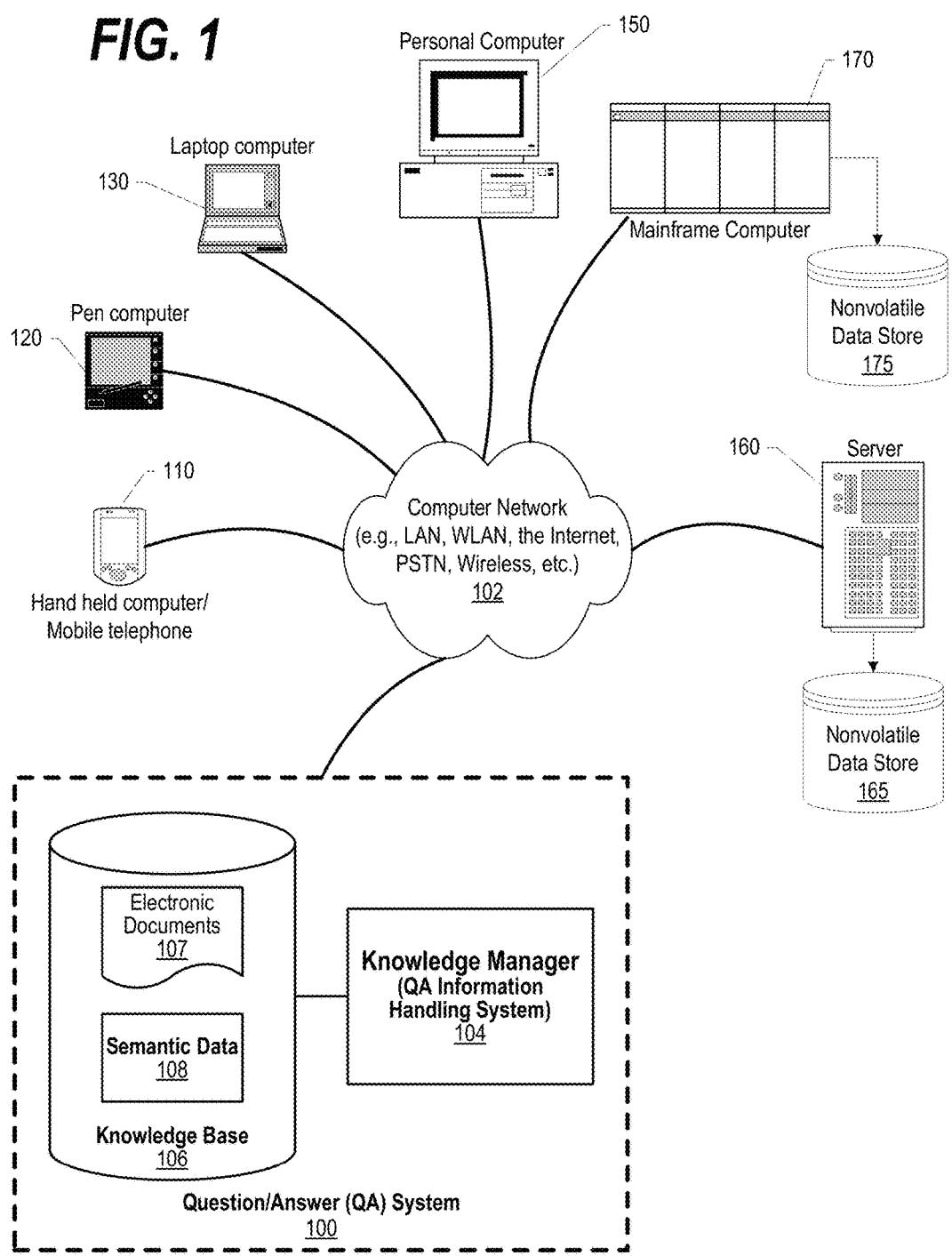
FIG. 1 depicts a network environment that includes a knowledge manager that utilizes a knowledge base.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer, server, or cluster of servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 depicts a schematic diagram of one illustrative embodiment of a question/answer creation (QA) system 100 in a computer network 102. Knowledge manager 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and network 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive input from the network 102, a corpus of electronic documents 106 or other data, a content creator 108, content users, and other possible sources of input. In one embodiment, some or all of the inputs to knowledge manager 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 100. The document 106 may include any file, text, article, or source of data for use in knowledge manager 100. Content users may access knowledge manager 100 via a network connection or an Internet connection to the network 102, and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 100 may interpret the question and provide a response to the content user containing one or more answers to the question. In some embodiments, knowledge manager 100 may provide a response to users in a ranked list of answers.

In some illustrative embodiments, knowledge manager 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question.

More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 100. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
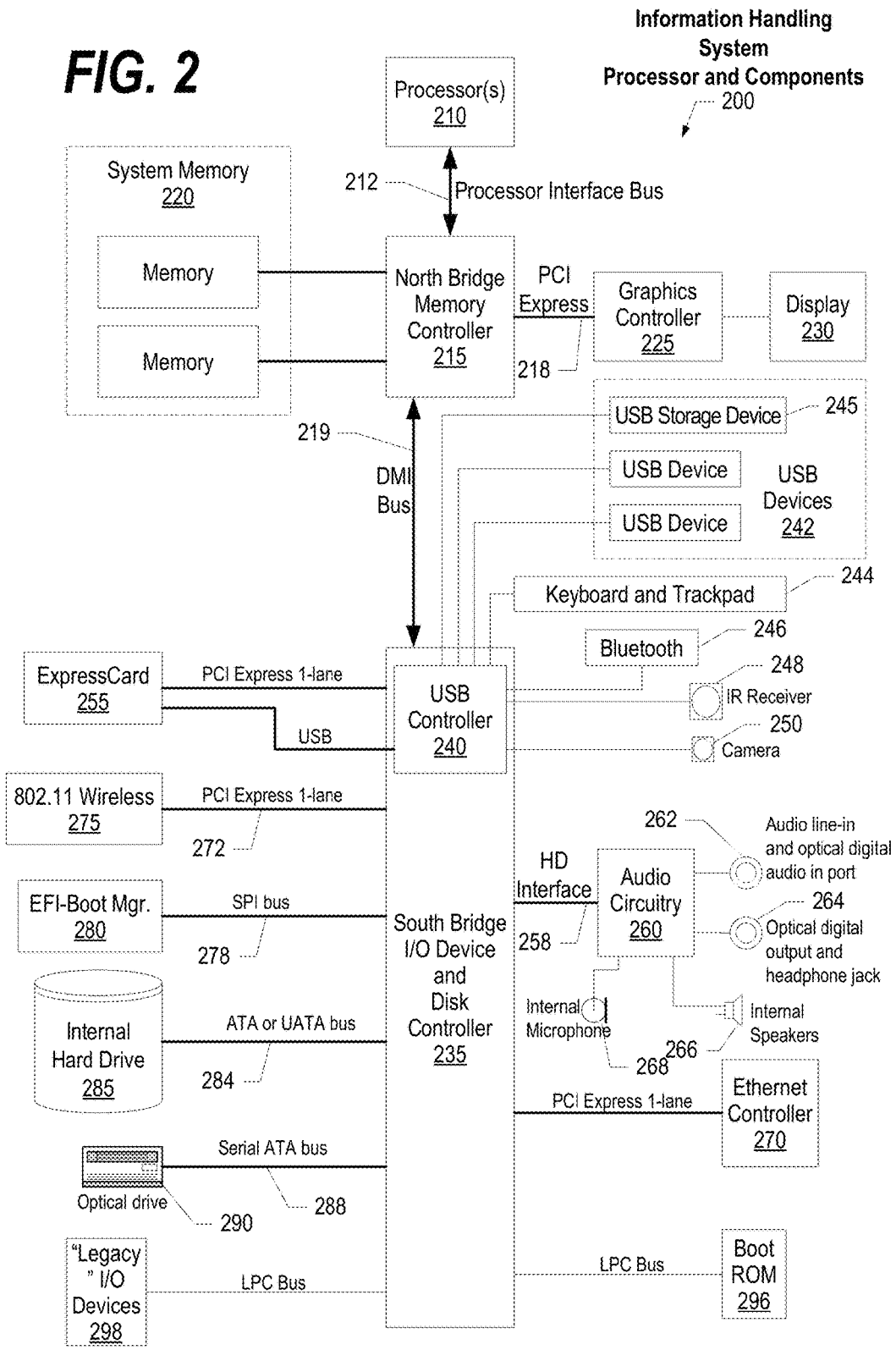
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 0.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
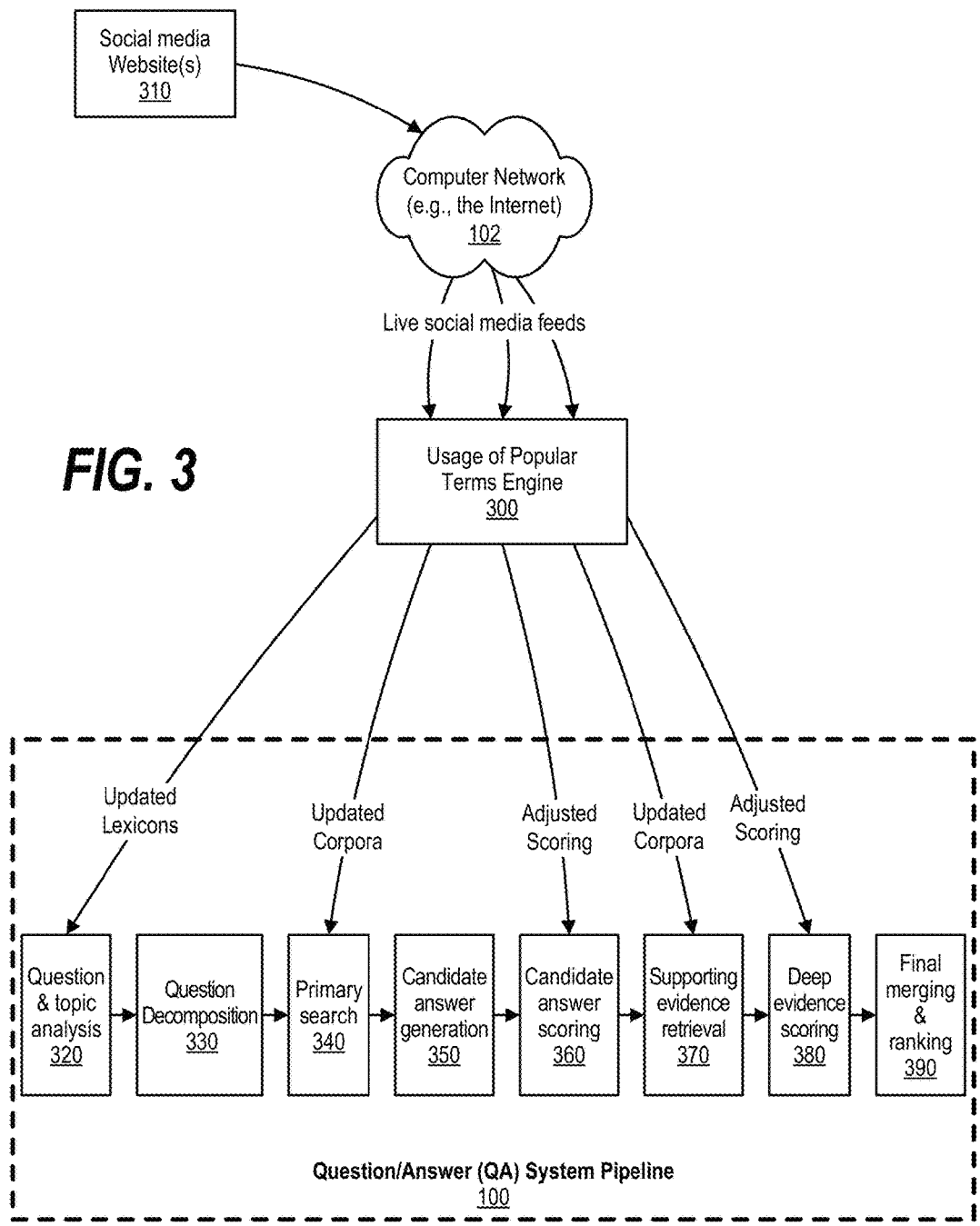
FIG. 3 is a component diagram depicting the various components in adjusting time dependent terminology in a Question and Answer (QA) System.
Figure 4:
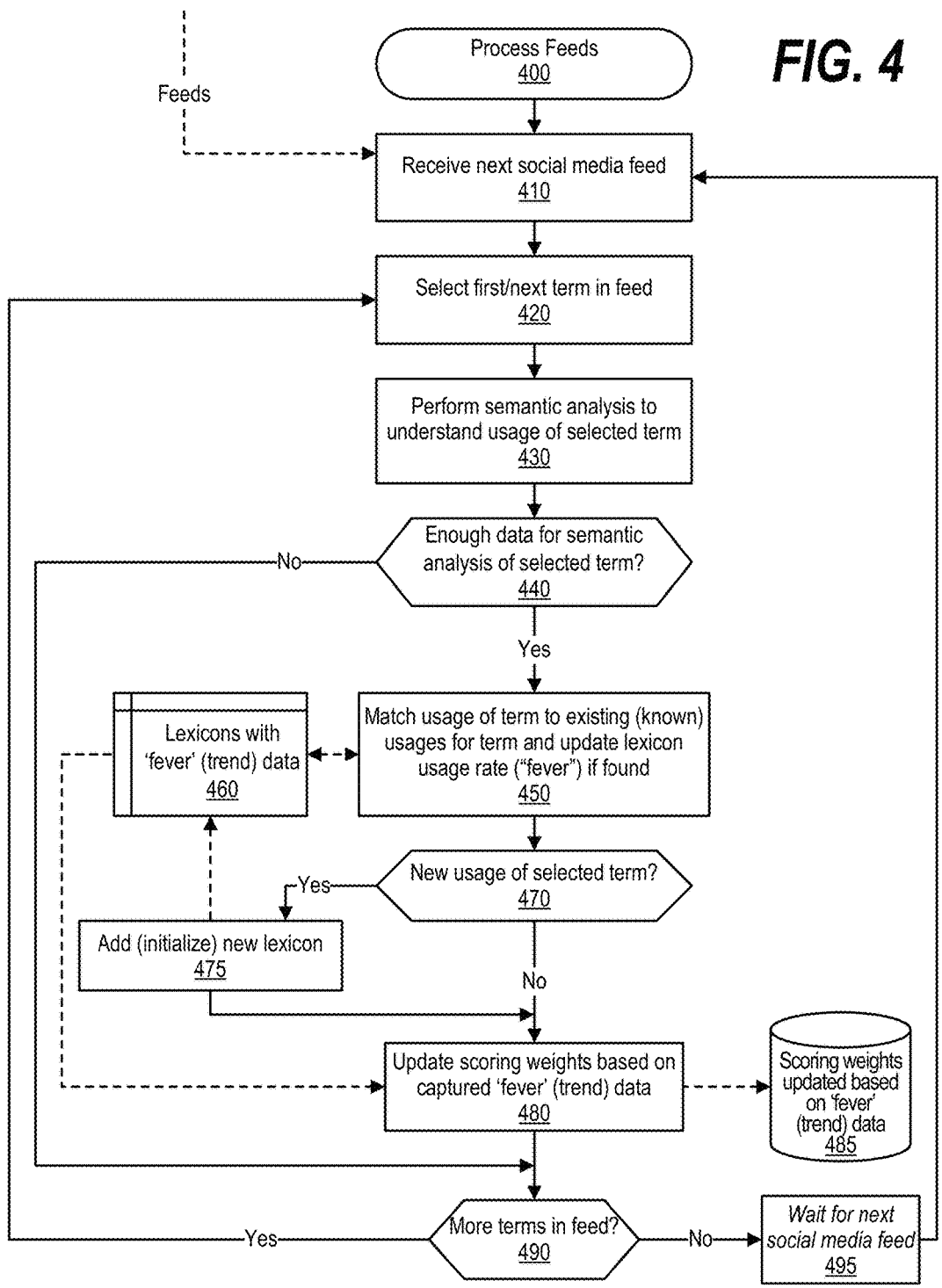
FIG. 4 is a depiction of a flowchart showing the logic used in processing feeds received from a social media source.
Figure 5:
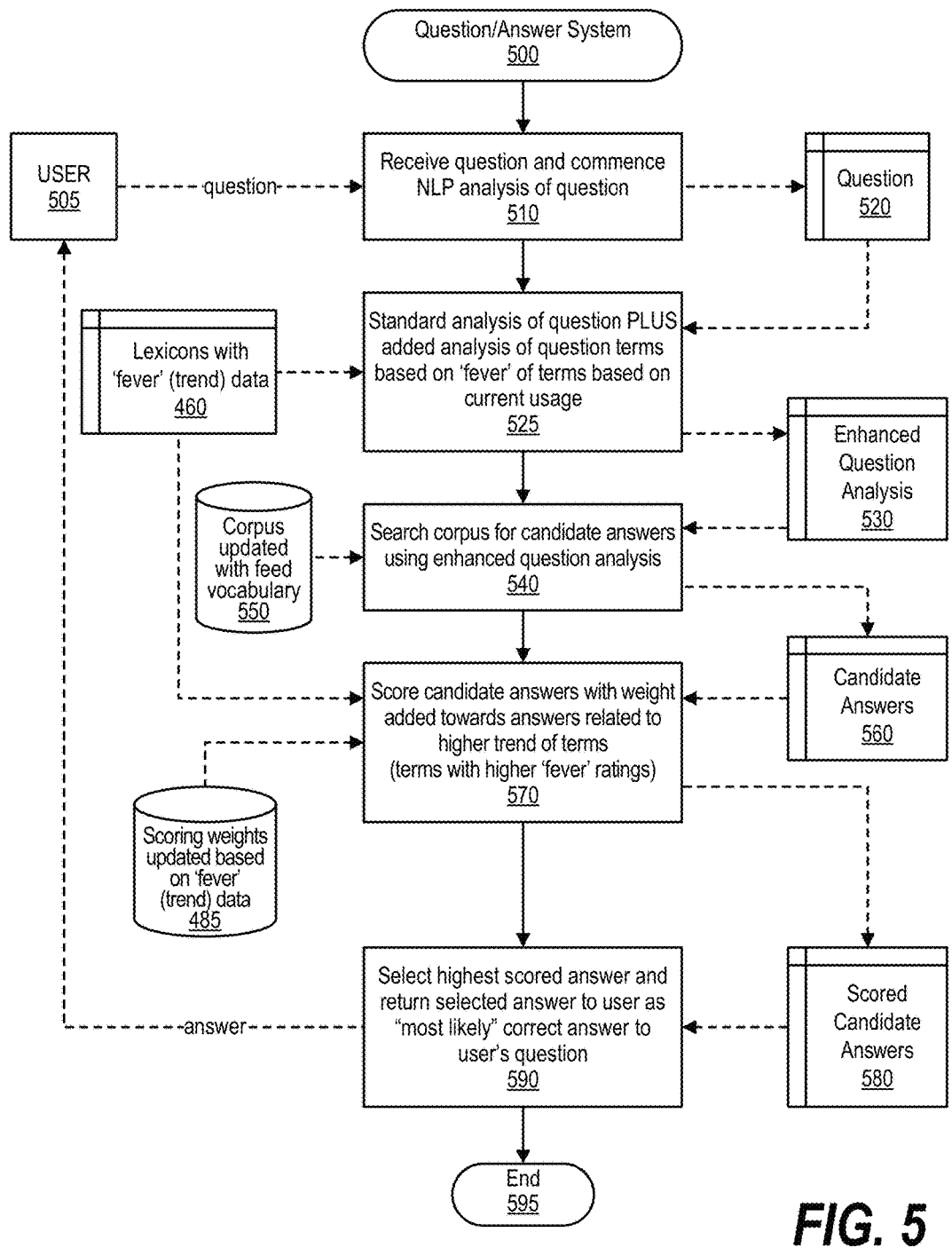
FIG. 5 is a depiction of a flowchart showing the logic performed by the Question/Answer (QA) System to answer questions using lexicons with trend data.

FIGS. 3-5 depict an approach that can be executed on an information handling system, to adjust for time dependent terminology in a Question/Answer (QA) system, such as QA System 100 shown in FIG. 1. An approach is provided to adjust time dependent terminology in a question and answering (QA) system. The approach ingests a set of documents to produce a corpus utilized by the QA system. A base time is established and the approach acquires a temporally accurate lexicon of terms that correspond to the base time. A corpus of the QA system is updated according to the lexicon. The QA system answers a question according to the updated corpus. In one embodiment, the lexicon is derived from live feeds that are received from social media sources. In one embodiment, a base lexicon is updated according to terms that correspond to the base time to produce the temporally accurate lexicon. In one embodiment, when answering the question, the system: produces a set of candidate answers. The candidate answers are weighted according to a trend value that corresponds to the lexicon. In a further embodiment, a semantic analysis is performed on the terms in order to create the temporally accurate lexicon of terms. Terms might include different types of terms such as slang terms, pop culture terms, and an event-related terms. A time-based usage amount corresponding to the lexicon is determined that relates to the "fever" of the usage of the term. A trend value is then generated based on the time-based usage amount, with the weighting of the candidate answers resulting in scored candidate answers. The trend value of terms is increased in response to an increase in the time-based usage amount, and decreased in response to a decrease in the time-based usage amount. The scored candidate answer that has the highest score is selected as the most likely answer and returned to the requestor.

FIG. 3 is a component diagram depicting the various components in adjusting time dependent terminology in a Question and Answer (QA) System. Engine 300 is built to adjust for time dependent terminology in QA system 100. A set of documents is ingested (retrieved, processed, etc.) by QA system 100 to produce a corpus that is utilized by QA system 100. A base time is established by engine 300, such as the time in which a document or feed is captured. Engine 300 acquires a temporally accurate lexicon of terms that correspond to the base time established by engine 300. Using engine 300, QA system 100 will digest real time feeds from sources, such as social media websites 310, and use the feeds to change the relationships between words, as well as ontologies. The natural language processing of the QA system changes the meaning of lexicons based on the new information that it ingests through the live pop culture feed. The information provided from the pop culture feed is used to update ontologies, change relational databases, and change the corpora itself.

As previously mentioned, the lexicon, vocabulary, and slang used in a language evolves, oftentimes rapidly, over time. In addition, various interest groups often use a similar lexicon. Therefore, to keep answers to questions more relevant, engine 300 updates the QA system 100 regularly with topical information and maintains the relationships between the lexicon used and the topics involved. As the engine 300 consumes live feeds, such as from social media websites 310, it updates the corpus used by the QA system 100 with new data, updates ontologies with the current lexicon, and weighs relationships or relevance of its data based on the current frequency of use (i.e. "fever) of a term.

The system evaluates the "fever" or trend value of candidate answers. When questions are asked by a user, the QA system generates candidate answers. If the system, using NLP logic, identifies terms in the candidate answers with a high fever or trend value, then the candidate answers are weighted higher, or towards that particular term. As questions arrive at QA system 100, if the natural language processing identifies terms with a high "fever," or "trend value," the system will weigh its candidate answers more towards the recently added, relevant information. Similarly, if the natural language processing comes across a recently added term to the lexicon, the candidate answers are weighted towards the recently added data that contained that new term. This weighting that uses the trend value can be multiplicative of its trend value. The weighting is based on the trend value.

The term 'gnarly' might be ambiguous, however, based on the fever or trend value, the system weights candidate answers toward the current trending meaning, as opposed to the traditional meaning. Regarding current event topics, after the hurricane named "Sandy" struck the East Coast of the United States, the system would weight candidate answers with the term "Sandy" towards the hurricane rather than the girl's name "Sandy." For example, the trend value score of the term "Sandy" therefore might be 20% as meaning a girl named "Sandy" and 80% referring to the hurricane named "Sandy." This is an example of possible weighting using a trend value. As an example of candidate answer scoring, if the meaning of "Sandy" in the question is weather or destruction related, and the weight shows it's trending, the system weighs this candidate answer higher than candidate answers with "Sandy" having a meaning of a girl named "Sandy."

QA system 100 updates ontologies on the fly and dynamically updates relationships. QA system 100 changes ontologies taking into account a trend value score pertaining to terms encountered by engine 300. The QA system 100 has a set of annotators and rankings based on the trend value score. In this manner, if a new term is discovered in the social media feeds with a relationship, and it matches a high trend value that is current, then QA system will leans towards these relationships in it's knowledge base. The QA system, using engine 300, retains metadata from the live feed and use the feeds to learn how frequently a particular event, term, or person is discussed in real time. These terms might be slang terms, pop terms, event-related terms, or the like. In essence, engine 300 builds a new type of ranking that takes into account how "hot" a term is that has already been ingested into the corpus of documents by QA system 100.

As a feed is ingested into the corpus (on the fly), the system determines if the terms in that feed, as embodied by the term, are becoming more important or less important (e.g., relevant, "hot," trendy, etc.) based on the live feeds received from sources such as social media websites 310. Additionally, the QA system uses the live feeds to remove, or deemphasize, entries and information, in the corpora that are no longer as relevant, "hot," or trendy. As entries are redacted in feeds, such as those from social media websites 310, the QA system updates its information accordingly. Information provided in the live feed is used to add, update, and possibly remove relationships between information in the corpora.

As shown, data generated by engine 300 are used as additional inputs to several components of the system pipeline utilized by QA system 100 when answering questions. A general overview of the pipeline for QA system 100 includes process 320 that analyzes the question and topic. As shown, many of the QA system components are updated based on the acquisition of the temporally accurate lexicon of terms by the processing shown herein. Process 320 utilizes the updated lexicons provided by engine 300. Process 330 performs question decomposition that is followed by primary search process 340. As shown, the primary search process utilizes the QA system corpora (corpus) that has been updated using the trend values for terms generated by engine 300. Process 350 generates candidate answers to the question posed by the user. Candidate answer scoring, process 360, utilizes the trend values for terms, so that candidate answers with higher trend values are scored higher than those with lower scores. Supporting evidence retrieval, process 370, also utilizes the updated QA system corpus that has been updated using the trend values generated by engine 300 when the system is retrieving evidence that supports the various candidate answers. Process 380, deep evidence scoring, scores the supporting evidence that was retrieved using traditional scoring techniques that are enhanced using the trend values generated by engine 300. Finally, process 390, performs a final merging and ranking of the candidate answers with the candidate answers being weighed according to the trend values that correspond to the lexicon included in the question and answer.

FIG. 4 is a depiction of a flowchart showing the logic used in processing feeds received from a social media source. Processing of feeds, such as those received from social media websites, commences at 400, whereupon, at step 410, the process receives a feed from a source, such as a social media website. At step 420, the terms in the feed are analyzed. In one embodiment, the process performs semantic analysis on a sentence or paragraph. The context of the phrase or sentence or a couple of sentences is used to identify the meaning of terms. At step 430, the system performs a semantic analysis of the selected term in order to understand the usage of the term as it is being used in the received feed. A decision is made by the process as to whether there is enough data for the system to perform an accurate semantic analysis of the selected term (decision 440). If there is enough data for the system to perform an accurate semantic analysis of the selected term, then decision 440 branches to the "yes" branch to process the selected term.

At step 450, the process attempts to match the usage of the selected term to existing (previously known) usages for the term. If the term is already known to the system and is not the standard dictionary meaning. In one embodiment, a dictionary with semantic meanings is utilized so that a fever is not necessarily associates with every word in the feed. In this embodiment, terms only get a fever (trend value) if the term has a new meaning outside the standard dictionary meaning. The lexicon usage rate ("fever") of the lexicon is updated in memory area 460. A decision is made by the process as to whether the usage of the selected term is a new usage of the term rather than an already known usage (decision 470). If the usage of the term is a new usage of the term, not previously known to the system, then decision 470 branches to the "yes" branch whereupon, at step 475, the new lexicon is added to memory area 460 and its usage rate is initialized (e.g., to one usage at the base time, etc.). On the other hand, if the usage (lexicon) associated with the term was already known to the system (with usage data already updated in step 450), then decision 470 branches to the "no" branch bypassing step 475.

At step 480, the process updates the scoring weights (the "trend value") associated with the lexicon. The update of the trend value for the lexicon is based on the captured "fever" or trend data that has been captured for the lexicon over time. Trend values are higher for lexicons that are more recently captured as well as for lexicons that occur at a higher frequency in a more-recent timeframe. In addition, a term might "decay" over time as is less trendy. For example, in a few years the term "Sandy" will likely decay from more likely meaning the hurricane and revert back to more likely meaning a girl named "Sandy." Using the "Sandy" example, while lexicon meaning "a hurricane" may have a high value of occurrences around the time of the event, these occurrences will be further back in time in a few years, so the relative weight (trend value) of the lexicon meaning "a hurricane" might be less than the lexicon meaning "a girl's name" which might be occurring at a higher frequency in a future timeframe. The trend values for lexicons are stored in data store 485.

A decision is made by the process as to whether there are more terms in the received feed to process (decision 490). If there are more feeds to process, then decision 490 branches to the "yes" branch which loops back to process the next term in the feed. This looping continues until there are no more terms in the feed to process, at which point decision 490 branches to the "no" branch whereupon, at step 495, the process waits for the next feed to arrive from a source, such as from a social media website. When the next feed arrives, then processing loops back to step 410 to process the new feed as discussed above.

FIG. 5 is a depiction of a flowchart showing the logic performed by the Question/Answer (QA) System to answer questions using lexicons with trend data. Processing performed by the QA system to answer a question posed by user 505 commences at step 510 with the system receiving the question from the user and starting a natural language process (NLP) to analyze the question. The question is stored in memory area 520.

At step 525, the QA system performs its standard analysis of the question with additional analysis being performed on the question based on the "fever" or trend data (e.g., trend value, etc.) associated with the lexicons of terms current used in the social environment. The enhanced question analysis, based in part on the lexicons that include "fever," or trend type data are stored in memory area 530.

At step 540, the process searches a corpus of the QA system for candidate answers using the enhanced question analysis stored in memory area 530. In addition, the corpus, stored in data store 550, has been updated with lexicon trend data that was found in feeds from sources, such as ingested documents and feeds from social media feeds. The candidate answers identified at step 540 are stored in memory area 560 for further scoring and analysis.

At step 570, the set of candidate answers stored in memory area 560 are weighted according to various scoring factors including the trend value that is found to correspond to lexicons found in various answers. For example, using the example introduced in FIG. 3, if candidate answers relate to the term "gnarly", those with lexicons meaning "knotty and twisted" might be weighted more heavily using the trend data than those with lexicons meaning "radical" since, in the example introduced in FIG. 3, the use of the term "gnarly" to mean "radical" occurred 20% in recent feeds while the same term meaning "knotted or twisted" occurred 80% in recent feeds. The scored candidate answers are stored in memory area 580.

At step 590, the process selects the highest scored candidate answer and returns the selected answer to user 505 as the "most likely" correct answer to the user's question. QA system processing of the user's question thereafter ends at 595.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, in an information handling system comprising a processor and a memory, of adjusting time dependent terminology in a question and answering (QA) computer system, the method comprising:
   ingesting a set of documents to produce a base corpus, the base corpus stored in a computer-readable data store accessible by the QA computer system;
   acquiring, by the QA computer system, a plurality of lexicons from one or more feeds from social media;
   performing, by the QA computer system, a semantic analysis of one or more terms in the plurality of lexicons, wherein the semantic analysis determines a context and a current usage for the one or more terms;
   in response to determining that the current usage of a selected term differs from a standard usage of the selected term, updating a trend value corresponding to the lexicon associated with the selected term;
   updating the base corpus of the QA computer system according to the plurality of lexicons, the updating resulting in an updated corpus;
   receiving, by the QA computer system, a question from a user device via a communication network; and
   answering, by the QA computer system, the question according to the updated corpus, wherein the answering comprises:
      searching the updated corpus for a plurality of candidate answers to the question, wherein at least one of the plurality of candidate answers is associated with one of the plurality of lexicons;
      scoring the plurality of candidate answers, wherein the scoring for each answer is based partly on the trend value of the lexicon associated with the candidate answer; and
      providing to the user device via the communication network one or more of the plurality of candidate answers based on the scoring.

2. The method of claim 1 wherein at least one of the one or more feeds from social media is a live feed.

3. The method of claim 1 further comprising:
   wherein at least one of the terms is selected from the group consisting of a slang term, a pop culture term, and an event-related term.

4. The method of claim 1, wherein updating the trend value corresponding to the lexicon associated with the selected term further comprises:
   increasing the trend value corresponding to the lexicon in response to an increase in a time-based usage amount of the selected term; and
   decreasing the trend value corresponding to the lexicon in response to a decrease in the time-based usage amount of the selected term.

5. An information handling system comprising:
   one or more processors;
   a memory coupled to at least one of the processors;
   a display; and
   a set of instructions stored in the memory and executed by at least one of the processors to adjust time dependent terminology in a question and answering (QA) computer system, wherein the set of instructions perform actions of:
      ingesting a set of documents to produce a base corpus, the base corpus stored in a computer-readable data store accessible by the QA system;
      acquiring by the QA computer system, a plurality of lexicons from one or more feeds from social media;
      performing, by the QA computer system, a semantic analysis of one or more terms in the plurality of lexicons, wherein the semantic analysis determines a context and a current usage for the one or more terms;
      in response to determining that the current usage of a selected term differs from a standard usage of the selected term, updating a trend value corresponding to the lexicon associated with the selected term;
      updating the corpus of the QA computer system according to the plurality of lexicons, the updating resulting in an updated corpus;
      receiving, by the QA computer system, a question from a user device via a communication network; and
      answering, by the QA computer system, the question according to the updated corpus, wherein the answering comprises:
         searching the updated corpus for a plurality of candidate answers to the question, wherein at least one of the plurality of candidate answers is associated with one of the plurality of lexicons;
         scoring the plurality of candidate answers, wherein the scoring for each answer is based partly on the trend value of the lexicon associated with the candidate answer; and
         providing to the user device via the communication network one or more of the plurality of candidate answers based on the scoring.

6. The information handling system of claim 5 wherein at least one of the one or more feeds from social media is a live feed.

7. The information handling system of claim 5 further comprising:
wherein at least one of the terms is selected from the group consisting of a slang term, a pop culture term, and an event-related term.

8. The information handling system of claim 5, wherein updating the trend value corresponding to the lexicon associated with the selected term further comprises:
increasing the trend value corresponding to the lexicon in response to an increase in a time-based usage amount of the selected term; and
decreasing the trend value corresponding to the lexicon in response to a decrease in the time-based usage amount of the selected term.

9. A non-transitory computer readable storage medium, comprising computer instructions stored thereon that, when executed by an information handling system, causes the information handling system to adjust time dependent terminology in a question and answering (QA) computer system by performing actions comprising:
ingesting a set of documents to produce a base corpus, the base corpus stored in a computer-readable data store accessible by the QA computer system;
acquiring, by the QA computer system, a plurality of lexicons from one or more feeds from social media;
performing, by the QA computer system, a semantic analysis of one or more terms in the plurality of lexicons, wherein the semantic analysis determines a context and a current usage for the one or more terms;
in response to determining that the current usage of a selected term differs from a standard usage of the selected term, updating a trend value corresponding to the lexicon associated with the selected term;
updating the base corpus of the QA computer system according to the plurality of lexicons, the updating resulting in an updated corpus;
receiving, by the QA computer system, a question from a user device via a communication network; and
answering, by the QA computer system, the question according to the updated corpus, wherein the answering comprises:
searching the updated corpus for a plurality of candidate answers to the question, wherein at least one of the plurality of candidate answers is associated with one of the plurality of lexicons;
scoring the plurality of candidate answers, wherein the scoring for each answer is based partly on the trend value of the lexicon associated with the candidate answer; and
providing to the user device via the communication network one or more of the plurality of candidate answers based on the scoring.

10. The non-transitory computer readable storage medium of claim 9 wherein at least one of the one or more feeds from social media is a live feed.

11. The non-transitory computer readable storage medium of claim 9 further comprising:
wherein at least one of the terms is selected from the group consisting of a slang term, a pop culture term, and an event-related term.

12. The non-transitory computer readable storage medium of claim 9, wherein updating the trend value corresponding to the lexicon associated with the selected term further comprises:
increasing the trend value corresponding to the lexicon in response to an increase in a time-based usage amount of the selected term; and
decreasing the trend value corresponding to the lexicon in response to a decrease in the time-based usage amount of the selected term.

\* \* \* \* \*